(12) United States Patent
Sen et al.

(10) Patent No.: US 9,054,905 B2
(45) Date of Patent: Jun. 9, 2015

(54) METHOD AND APPARATUS FOR TIMING SYNCHRONIZATION AT SUB-SAMPLED RATE FOR SUB-SAMPLED WIDEBAND SYSTEMS

(71) Applicant: SAMSUNG ELECTRONICS CO., LTD., Suwon-si (KR)

(72) Inventors: Debarati Sen, Bangalore (IN); Jinesh P. Nair, Bangalore (IN); Sujit Jos, Bangalore (IN); Arun Naniyat, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/155,583

(22) Filed: Jan. 15, 2014

(65) Prior Publication Data

US 2014/0198830 A1 Jul. 17, 2014

(30) Foreign Application Priority Data

Jan. 15, 2013 (IN) .............................. 189/CHE/2013
Apr. 2, 2013 (KR) ........................ 10-2013-0035705

(51) Int. Cl.
H04L 25/02 (2006.01)
(52) U.S. Cl.
CPC ........ *H04L 25/0206* (2013.01); *H04L 25/0204* (2013.01); *H04L 25/0224* (2013.01); *H04L 25/0222* (2013.01)

(58) Field of Classification Search
USPC .......... 375/130, 137, 142, 145, 150, 260, 267
See application file for complete search history.

(56) References Cited

U.S. PATENT DOCUMENTS

| | | |
|---|---|---|
| 6,791,995 B1 | 9/2004 | Azenkot et al. |
| 2004/0190560 A1 | 9/2004 | Maltsev et al. |
| 2007/0217524 A1 | 9/2007 | Wang et al. |
| 2008/0063036 A1 | 3/2008 | Richards et al. |
| 2008/0139141 A1 | 6/2008 | Varghese et al. |
| 2009/0003308 A1* | 1/2009 | Baxley et al. .................. 370/350 |
| 2011/0249703 A1 | 10/2011 | Najar Marton et al. |
| 2013/0064124 A1* | 3/2013 | Sun ............................... 370/252 |

FOREIGN PATENT DOCUMENTS

| | | |
|---|---|---|
| EP | 1 313 283 A2 | 5/2003 |
| EP | 2 332 267 B1 | 2/2012 |
| KR | 10-2005-0063590 A | 6/2005 |
| KR | 10-2006-0036086 A | 4/2006 |
| KR | 10-2006-0113750 A | 11/2006 |
| KR | 10-2010-0106571 A | 10/2010 |

* cited by examiner

*Primary Examiner* — Kabir A Timory
(74) *Attorney, Agent, or Firm* — NSIP Law

(57) ABSTRACT

A method of timing synchronization in sub-band based ultra wideband systems, includes obtaining a coarse estimate of an offset in a time domain at a sub-sampled rate, and obtaining a fine estimate of the offset in an analog domain. The method further includes correcting a timing in the analog domain by transforming the fine estimate to an equivalent phase for the correcting.

17 Claims, 7 Drawing Sheets

METHOD AND APPARATUS FOR TIMING SYNCHRONIZATION AT SUB-SAMPLED RATE FOR SUB-SAMPLED WIDEBAND SYSTEMS

CROSS-REFERENCE TO RELATED APPLICATIONS

This application claims the benefit under 35 USC 119(a) of Indian Patent Application No. 189/CHE/2013, filed on Jan. 15, 2013, in the Indian Patent Office, and Korean Patent Application No. 10-2013-0035705, filed on Apr. 2, 2013, in the Korean Intellectual Property Office, the entire disclosures of which are incorporated herein by reference for all purposes.

BACKGROUND

1. Field

The following description relates to a method and an apparatus for timing synchronization at a sub-sampled rate for sub-sampled wideband systems.

2. Description of Related Art

Wideband communications are gaining importance for future wireless communications because of their potential to support an extremely high data rate of a gigabit per second. Power consumption is a critical issue in wideband systems considering a wide bandwidth involved. Developing low power, low cost, and low interference wideband transceivers has a huge commercial demand. A concept of sub-banding is being developed for wideband systems. With this concept, power saving is achieved in ultra wideband (UWB) systems.

Several technologies based on personal area networks (PANs) use this band to build applications that can achieve medium to high data communication rates. In a method of sub-banding, a given bandwidth of 500 MHz (or more) is divided equally into N sub-bands. These N sub-bands can be used to provide multiple users access to channel bandwidth, to increase rates of data communication by using different sub-bands to transmit different data streams, and improving communication performance by using different sub-bands to transmit a same data stream.

In sub-band ultra wide band (S-UWB) systems, a transmitting device includes a plurality of sub-band signal generators that generate a plurality of sub-band signals based on determined parameters, where each of the sub-band signals includes modulated bit streams spread using spreading codes. Further, at a receiver side, a receiving device of the S-UWB systems includes an analogue front end that receives an S-UWB signal including the sub-band signals from the transmitting device over a UWB channel. The receiving device also includes a sampler that samples the S-UWB signal at a rate of a sub-band bandwidth. A saving in energy is attributed to base-band processing at the sub-sampling rate, which may obviate a need of a higher sampling rate ADC used in full-band systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of timing synchronization in sub-band based ultra wideband systems, includes obtaining a coarse estimate of an offset in a time domain at a sub-sampled rate, and obtaining a fine estimate of the offset in an analog domain. The method further includes correcting a timing in the analog domain by transforming the fine estimate to an equivalent phase for the correcting.

The obtaining of the coarse estimate may include performing cross correlation of a sub-sampled signal with a sub-sampled training sequence in a digital domain.

The method may further include obtaining the coarse estimate for each sub-band based on a frequency diversity order of a user.

The method may further include obtaining a final coarse estimate of the offset from each sub-band by determining a maximum of estimates for a corresponding sub-band.

The obtaining of the fine estimate may include obtaining the fine estimate in the analog domain based on the final coarse estimate.

The obtaining of the fine estimate may include performing cross correlation of a delayed signal with a training sequence designed with a silence period.

A length of the training sequence may be equal to a number of orthogonal subcarriers present over a bandwidth of the delayed signal.

The training sequence may be an up-sampled version of a base training sequence.

The training sequence of a sub-band may be orthogonal up to a lag gap of an integer, the lag gap indicating a shift of sub-bands by a value of the integer.

The training sequence may be followed by the silence period of at least four orthogonal frequency division multiplexing symbols.

In another general aspect, an apparatus configured to perform timing synchronization in sub-band based ultra wideband systems, includes a coarse estimation unit configured to obtain a coarse estimate of an offset in a time domain at a sub-sampled rate, and a fine estimation unit configured to obtain a fine estimate of the offset in an analog domain. The apparatus further includes a timing correction unit configured to correct a timing in the analog domain by transforming the fine estimate to an equivalent phase for the correction.

The coarse estimation unit may be configured to perform cross correlation of a sub-sampled signal with a sub-sampled training sequence in a digital domain.

The fine estimation unit may be configured to perform cross correlation of a delayed signal with a training sequence designed with a silence period.

The apparatus may further include a phase locked loop circuit configured to determine the equivalent phase based on the fine estimate, an analog-to-digital converter configured to convert an input signal in the analog domain to a sub-sampled signal in a digital domain to be used to obtain the coarse estimate, and an analog delay circuit configured to delay the input signal, the delayed input signal being used to obtain the fine estimate.

In still another general aspect, a receiver configured to perform timing synchronization in sub-band based ultra wideband systems, includes a processor configured to determine a first estimate of a timing offset of an input signal, in a digital domain, and determine a second estimate of the timing offset in an analog domain based on the first estimate. The processor is further configured to determine an equivalent phase to be used to correct a timing of the input signal, based on the second estimate.

The processor may be configured to sub-sample the input signal to generate a sub-sampled signal in the digital domain, and perform cross correlation of the sub-sampled signal with a sub-sampled training sequence in the digital domain to generate the first estimate.

The processor may be further configured to scale the first estimate, and determine the second estimate based on the scaled first estimate.

The processor may be configured to delay the input signal, and perform cross correlation of the delayed input signal with a training sequence followed by a silence period, based on the first estimate, to generate a correlated output.

The processor may be configured to determine the second estimate to be the first estimate in response to the correlated output being greater than or equal to a predetermined threshold.

The processor may be configured to control a switching of an analog-to-converter clock from an initial phase to the equivalent phase based on a predetermined timing delay, to correct the timing of the input signal.

Other features and aspects will be apparent from the following detailed description, the drawings, and the claims.

Figure 1:
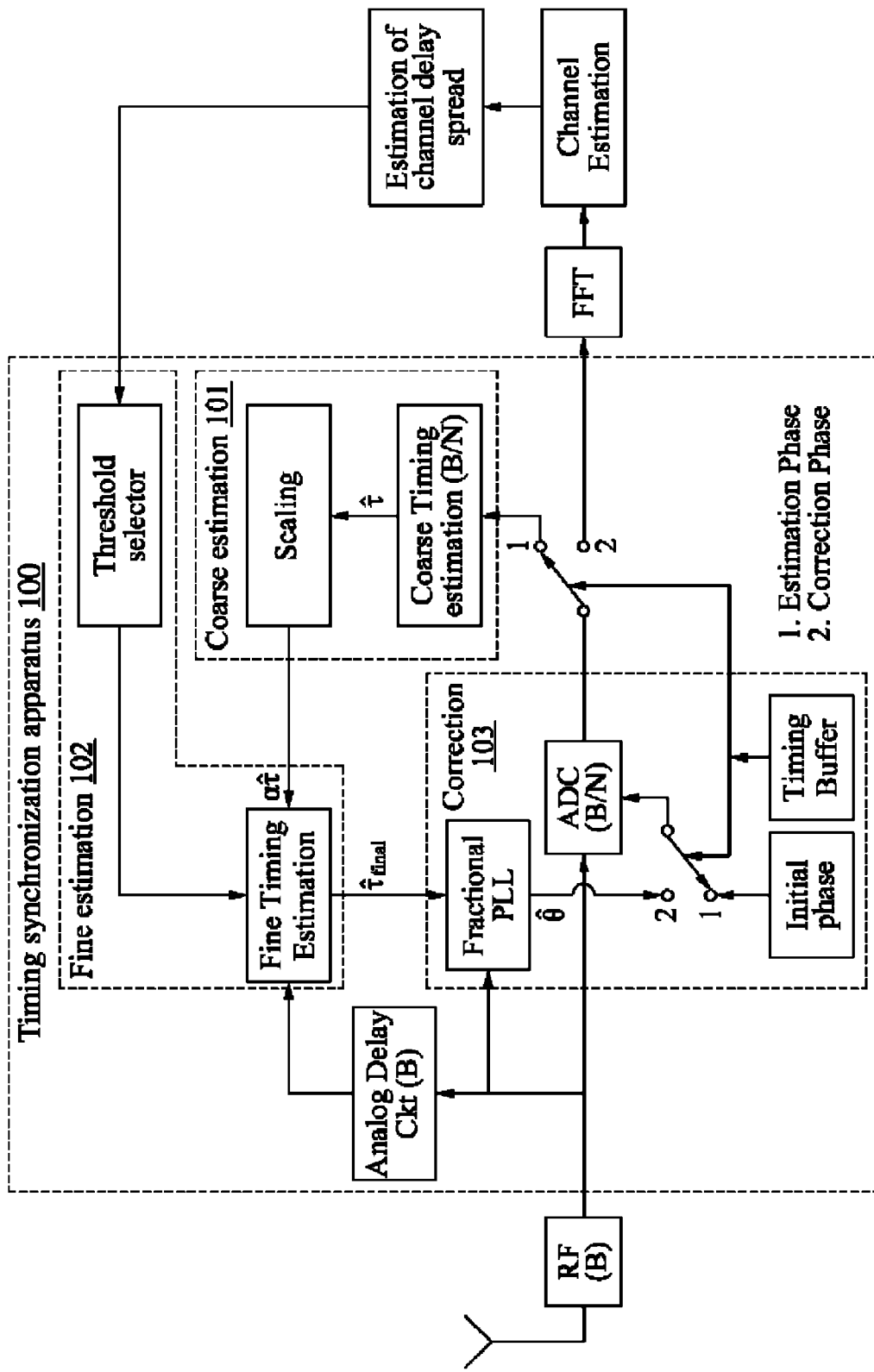
FIG. 1 is a block diagram illustrating an example of an apparatus that performs timing synchronization.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Examples of a method and an apparatus for timing synchronization at a sub-sampled rate for sub-sampled ultra wideband systems (UWB) are described herein. The method is of, and the apparatus includes, a synchronizer with a high synchronization probability to obtain a better channel estimate.

The method of the timing synchronization includes a mixed mode design. Initially, estimation of timing information is carried out in a digital domain at a sub-sampled rate (100 MHz) after an analog-to-digital conversion (ADC), and compensation is carried out over a real time analog signal of 500 MHz. Further, the estimated timing information is fed back to a fractional phase locked loop (PLL) to control a phase of a sampling clock of the ADC which results in correction of a sampling time. The method of the timing synchronization needs a suitable training sequence that takes care of a rate mismatch between the estimation and the compensation in the digital domain and an analog domain respectively. For example, the training sequence may be band-limited to a sub-sampled bandwidth.

FIG. 1 is a block diagram illustrating an example of an apparatus 100 that performs timing synchronization. The timing synchronization includes two stages. In a first stage, the apparatus 100 estimates an offset, and in a second stage, the apparatus 100 compensates a signal with the estimated offset. That is, the apparatus 100 that performs the timing synchronization includes a mixed mode design, as described herein.

The estimation of the offset is performed in a digital domain at a sub-sampled rate (100 MHz) after analog-to-digital converter (ADC), and the compensation is performed over a real time analog signal of 500 MHz. The mixed mode estimation and compensation include processing in both digital and analog domains. Hence, the timing synchronization includes the processing at a full rate and the sub-sampled rate. It is also assumed that a receiver system (e.g., the apparatus 100) is free from frequency offset errors.

The mixed mode design of the timing synchronization is based on a training sequence pattern, where silent periods are added for other sub-bands. Further, training sequences for the timing synchronization are added for a desired band in a preamble section dedicated for frequency synchronization of a sequence of a frame. The training sequences for different sub-bands are protected from overlapping with each other because of an aliasing effect of the sub-sampling.

Referring to FIG. 1, the apparatus 100 includes a coarse estimation unit 101, a fine estimation unit 102, and a correction unit 103. The coarse estimation unit 101 performs coarse estimation of a timing offset in each sub-band individually at the sub-sampled rate. The fine estimation unit 102 performs fine estimation of the timing offset at the full rate based on the coarsely-estimated timing offset and an analog (i.e., radio frequency (RF)) signal received in the analog domain, to finally generate an equivalent parameter corresponding to an estimated timing error input. The correction unit 103 compensates the analog signal in the analog domain based on the equivalent parameter.

The coarse estimation of the timing offset in each sub-band individually at the sub-sampled rate is described herein. Initially, the coarse estimation is performed in a sub-sampled domain. Consider the following parameters as described herein.

Let S denote a modulated sequence transmitted over a time-dispersive UWB fading channel given as:

$$S = \{\ldots s(n), s(n+1), \ldots\} \quad (1)$$

Let $h_b$ be complex baseband equivalent UWB channel coefficients applicable to a band b with an order P given as:

$$h_b = \{h_b(1), h_b(2), \ldots, h_b(P)\} \quad (2)$$

Let $\tilde{Y}$ represent a corresponding received complex sample sequence at a UWB receiver front end shown as:

$$\tilde{Y} = \{\ldots y(n), y(n+1), \ldots\} \quad (3)$$

Further, $N_s$ is a total number of samples in each OFDM symbol in a transmitted preamble. Then, sub-sampling of an $n^{th}$ received sample of an $l^{th}$ OFDM symbol duration is expressed as:

$$y(l, n) = \sum_{b=1}^{D} \sum_{p=1}^{P} s(l, n - p - q_b) h_b(p) + w(l, n) \quad (4)$$

$$0 < n < N_s, \ 0 < l < L, \ 1 \le p \le P$$

In Equation 4, w(l, n) is a complex additive white Gaussian noise (AWGN) of the $n^{th}$ sample of the $l^{th}$ OFDM symbol, D is a total number of sub-bands, L is a number of training symbols of a length $N_s$ dedicated for the timing synchronization, and $q_b$ is a timing offset of a $b^{th}$ sub-band channel. The timing offset $q_b$ is different for a different sub-band channel response.

Assuming that packet detection is over, the timing synchronization targets to estimate a start of a first frequency synchronization sequence of the preamble especially a start of a Fast Fourier transform (FFT) window for it.

Equation 4 indicates that each sub-band signal experiences a different amount of a shift in the FFT window based on the corresponding timing delay $q_b$ contributed by the sub-band channel. But, due to the sub-sampling, the received sample y(l, n) experiences some equivalent offset effect of all of the sub-bands.

An estimation of a timing offset of a full band channel is from the estimation of the individual sub-band timing offsets at the sub-sampled rate. This needs a proper design of a training sequence to avoid overlapping of the sub-bands in the sub-sampled domain. This is implemented by a silence period based training design. Hence, for a training part of the preamble, for a first sub-sampled OFDM symbol transmitted over a sub-band 1, Equation 4 can be modified to:

$$y(1, n) = \sum_{p=1}^{P} s(l, n - p - q_1) h_1(p) + w(l, n) \quad (5)$$

In the digital domain, received samples of Equation 5 are cross-correlated with known training sequences, i.e., a preamble pattern $\{t\} = \{t(1), t(2), \ldots, t(N)\}$ that is band-limited to a sub-band bandwidth. A cross-correlated output $C_b$ (l, n) of the $n^{th}$ sample of the $l^{th}$ OFDM symbol corresponding to the sub-band 'b' is obtained as:

$$C_b(l, n) = \sum_{i=1}^{N_s} y(l, n+i) t^*(i) \quad (6)$$

for $$1 \le l \le L, 1 \le n \le N_s;$$

$$b \in [1, \ldots D]$$

In Equation 6, * denotes a complex conjugate operation. The coarsely-estimated timing offset $\hat{\tau}$ is obtained by finding a maximum delay point out of correlation peaks for all the sub-bands, using Equation 7 below:

$$\hat{\tau} = \max\left(\max\left(\frac{C_b}{\text{var}(C_b)}\right)\right); \quad (7)$$

$$b \in [1, \ldots D]$$

The above Equation 7 determines an instant of a maximum delayed multipath with significant energy of the full band channel as viewed by a sub-sampled window. A major portion of the full band channel energy lies within an equivalent scaled-up version $\alpha\hat{\tau}$ ($\alpha$=sub–sampling factor=N) of the coarsely-estimated timing offset.

The fine estimation of the timing offset is described herein. The fine estimation unit 102 estimates the timing offset at a higher sampling rate in the analog domain. The fine estimation unit 102 receives the scaled coarsely-estimated timing offset in the digital domain, and the delayed analog signal from an analog delay circuit. The analog delay circuit delays the analog signal to introduce a delay due to the coarse estimation, the scaling up of the coarsely-estimated timing offset, and latency in a feedback path. The delayed analog signal is stored in a buffer. The fine estimation is demonstrated in FIG. 2.

Once the coarse estimation and the fine estimation are done, the correction unit 103 performs a timing correction based on the finely-estimated timing offset $\hat{\tau}_{final}$ in operations as described herein. The timing correction is performed in the analog domain at a higher rate, once a rest part of the preamble starts arriving. The timing correction is performed by changing a sampling clock phase of the ADC to the equivalent phase, which results in changing a sampling time for a next part of the frame.

The finely-estimated timing offset is fed to a fractional PLL of the correction unit 103, and the fractional PLL generates an equivalent phase $\hat{\theta}$ based on the finely-estimated timing offset. A timing buffer of the correction unit 103 controls a switching of an ADC clock from an initial phase to the generated equivalent phase based on a predefined timing delay. A flow of the analog signal in the apparatus 100 during the coarse and fine estimation and the timing correction is controlled by two switches. In FIG. 1, the switches are in position 1 during an estimation phase.

The switches are connected to the position 1 until the coarsely-estimated timing offset, the finely-estimated timing offset, and the equivalent phase are estimated. Then, both of the switches are moved to position 2 to compensate based on the equivalent phase, and to feed the sampled analog signal to an FFT after the sub-sampling.

In an example, the timing synchronization can also be achieved by obtaining the coarsely-estimated and finely-estimated timing offsets fully in the digital domain. There exists applications of sub-sampled, orthogonal frequency division multiplexing (OFDM) based S-UWB systems, where the synchronization can be performed only in the digital domain, avoiding the complexity of the analog domain. The timing synchronization in the digital domain is described herein with the following examples.

In an example, where Quality of Service (QoS) is achieved by improvising code diversity instead of frequency, the same data of a user is sent over different orthogonal codes in a single sub-band to achieve a diversity gain and, hence, improved QoS (for example, bit error rate (BER)) performance. Sub-bands are used to enhance a data rate for one user or to support multiple users in a network. In this example, all signals in a sub-band will experience the same timing offset estimated in a coarse estimation and, hence, the same amount of shift in an FFT window.

This coarse estimation can be improved by putting a predefined threshold on a correlation output. The predefined threshold is a function of a root mean square (RMS) delay spread of the full band channel. Correction can be carried out in the sub-sampled digital domain by shifting a sequence by an estimated instant. This method eliminates the need of fine estimating of a timing offset and timing correction. This method also provides fast estimation compared to a mixed mode solution for timing synchronization.

If signals are transmitted with a diversity order of 1 along sub-bands, the signals do not add up automatically after de-spreading by orthogonal codes. The orthogonal codes cancel an effect of interference of all other codes allotted to unwanted sub-bands. Similarly, for a diversity order of 2, along a frequency axis, fine estimation can be completely performed in the digital domain as per the method described in the above examples, and compensation can be performed in the analog domain.

Further, in another example, where parallel processing for a diversity along a frequency, a digital solution is provided by finely estimating a timing offset, and providing timing correction, channel estimation and correction individually for each sub-band signal. Then, the signals of the sub-bands involved to achieve diversity are added after de-spreading and fed to a demodulator. This process increases complexity, which is proportional to a diversity order.

Figure 2:
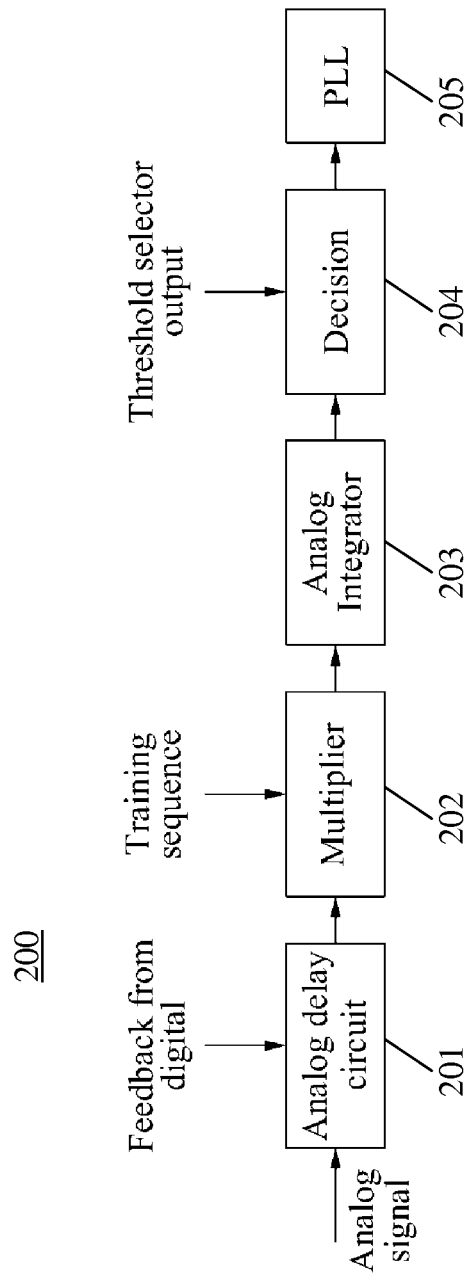
FIG. 2 is a block diagram illustrating an example of an apparatus that performs fine timing synchronization.

FIG. 2 is a block diagram illustrating an example of an apparatus 200 that performs fine timing synchronization. A delayed analog signal is cross-correlated with an analog template of the same training sequence utilized for coarse estimation of a timing offset in a digital domain, after properly scaling up the coarsely-estimated timing offset. The cross-correlation in an analog domain is performed in two operations as detailed below.

Referring to FIG. 2, the apparatus 200 includes an analog delay circuit 201, a multiplier 202, an analog integrator 203, a decision unit 204, and a PLL circuit 205. Initially, the analog delay circuit 201 receives a buffered analog signal and feedback from the digital domain, and provides a delay resolution of 1/B (B=full bandwidth) to delay the analog signal. For a channel bandwidth of 500 MHz, a 2 nsec delay resolution may be used.

The multiplier 202 receives the delayed analog signal and a training sequence, and multiplies the delayed analog signal by the training sequence. The analog integrator 203 receives an output of the multiplier 202, and cross-correlates the output to generate a correlated output as:

$$C'(\kappa) = \int_{t=\kappa}^{T+\kappa} \tilde{s}(t-\kappa)\tilde{i}_r(t)dt, \quad (8)$$
$$1 \le \kappa \le \alpha\hat{\tau}$$

For low delay spread channels, a normalized correlation peak gives a finely-estimated timing offset. For higher delay spread channels, initially the correlation peak is utilized to correct a timing error of the incoming signal.

Referring to FIG. 1, after channel estimation in the digital domain, an estimation of a channel delay spread is performed and fed back to a threshold selector of the fine estimation unit 102. As per the delay spread of different UWB channel models, the threshold selector selects and outputs a predefined threshold ($\lambda$).

Referring again to FIG. 2, the threshold selector output (i.e., the predefined threshold) is fed back to the decision unit 204 in the analog domain. The decision unit 204 determines the finely-estimated timing offset $\hat{\tau}_{final}$ by comparing the correlated output $C'(\kappa)$ with the threshold. $\hat{\tau}_{final}$ represents an instant when $C'(\kappa) \ge \lambda$, and the decision unit 204 outputs the finely-estimated timing offset to the PLL circuit 205, e.g., of the timing correction unit 103 of FIG. 1.

Figure 3:
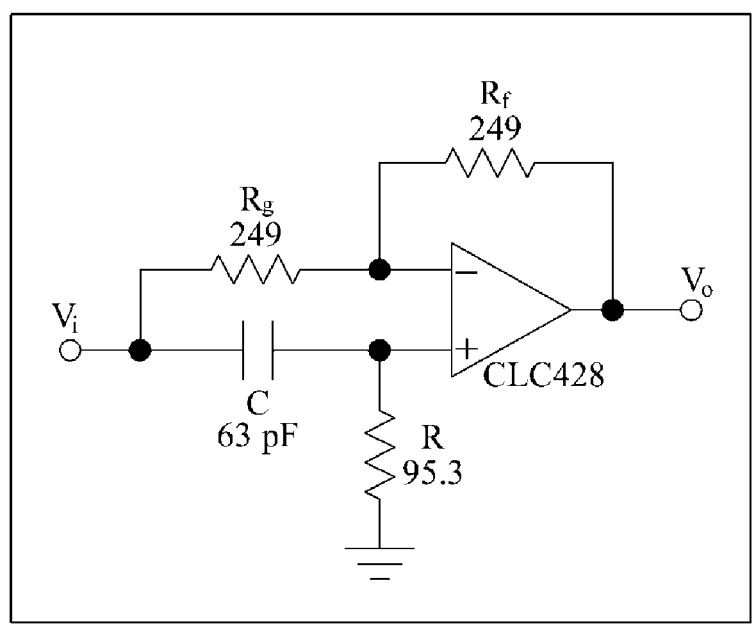
FIG. 3 is a circuit diagram illustrating an example of an analog delay circuit for fine timing synchronization.

FIG. 3 is a circuit diagram illustrating an example of an analog delay circuit for fine timing synchronization. The compact circuit shown in FIG. 3 provides a controllable analog delay to an input analog signal $V_i$ that can be accurately predicted if an operational amplifier (OPAMP) (e.g., CLC428) with a wide bandwidth is selected. With a given value of a resistor R (95.3 ohms), a capacitor C (63 picofarads (pF)), and other resistors $R_g$ and $R_f$ (249 ohms), a delay of approximately $(63 \times 10^{-12})*(95.3 \times 2)$, which equals to 12 nsec, can be generated and applied to the input analog signal $V_i$ to generate an output analog signal $V_o$. This delay can be tuned to 2 nsec. OPAMP integrators capable of handling a 500 MHz wide signal may also possible by using integrated circuits (ICs), such as AD 8045 and AD 8099.

Figure 4:
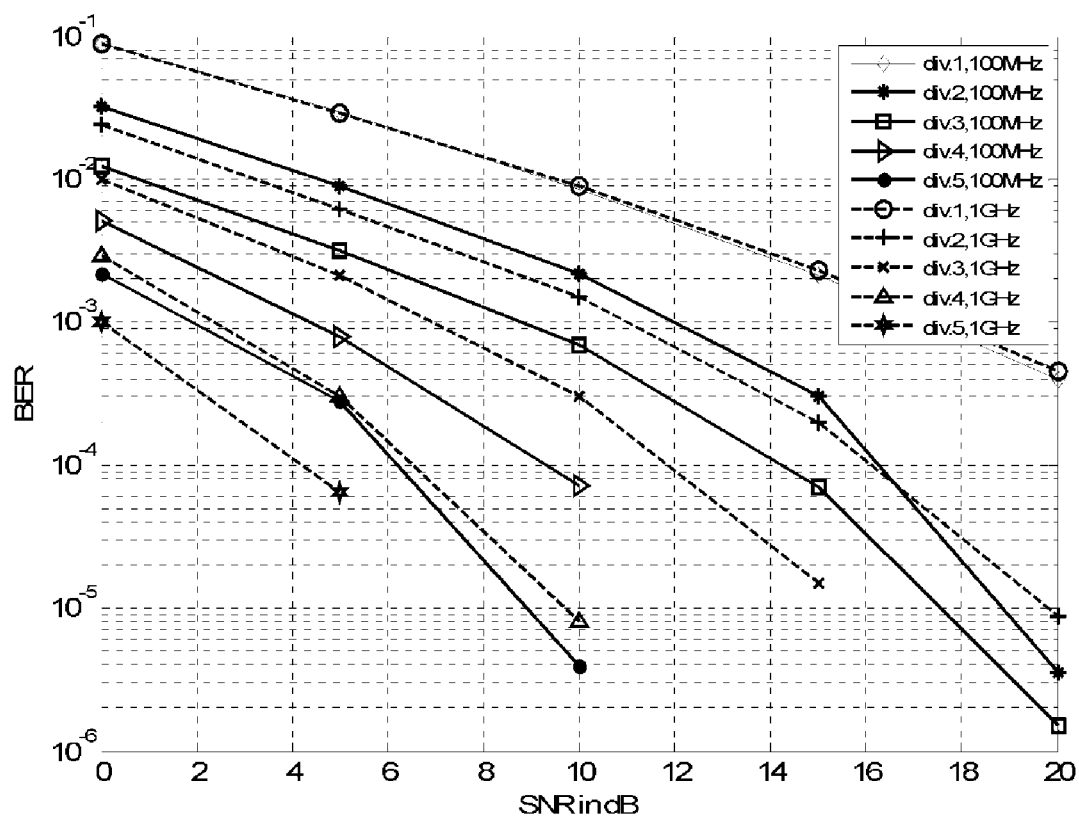
FIG. 4 is a graph illustrating an example of a comparison of a bit error rate (BER) and a signal-to-noise ratio (SNR) of an orthogonal frequency division multiplexing (OFDM) based sub-band ultra-wide band (S-UWB) system with timing synchronization at 100 MHz and 1 GHz over an UWB channel.

FIG. 4 is a graph illustrating an example of a comparison of a BER and a signal-to-noise ratio (SNR) of an OFDM-based S-UWB system with timing synchronization at 100 MHz and 1 GHz over an UWB channel. The BER of the system with the timing synchronization for a variable diversity order ranging from 1 to 5 is shown in FIG. 4.

A performance of the described timing synchronization apparatus and method is evaluated through a simulation of the BER of the OFDM-based SUWB system. Simulation parameters considered for this simulation analysis is tabulated in Table1. The performance of a 100 MHz synchronizer is also compared with a 1 GHz synchronizer to calculate an estimation loss in a sub-sampled domain. The performance is obtained over the IEEE 802.15.4 channel model CM3, which is considered to be a low delay spread channel with an RMS delay spread of 11 nsec.

TABLE 1

Simulation Parameters

| Sr. No | Simulation Parameter | Value/Type |
| --- | --- | --- |
| 1 | UWB Bandwidth (B) | 500 MHz |
| 2. | Number of Sub-bands (N) | 5 |
| 3 | Sub-sampling rate | 100 MHz |
| 4 | Chip duration/sampling time | 10 ns |
| 5 | FFT size | 32 |
| 6 | CP length | 10 |
| 7 | OFDM symbol duration | 420 ns |
| 8 | Data subcarriers | 32 |
| 9 | Spreading Codes | Walsh Hadamard (WH) |
| 10 | Spreading code length (P) | 8 |
| 11 | Modulation Type | BPSK |
| 12 | Coding | Uncoded |
| 13 | Payload | 350 OFDM symbols/frame |
| 14 | Data Rate | 54 Mbps (with diversity 5) |
| 15 | Channel | IEEE 802.15.4, CM3(RMS delay = 11 nsec) |

A basic training sequence considered for the simulation is a 31 length m-sequence padded with 1 to make it an even sequence and a 42 length complex chirp sequence. Only one basic sequence per sub-band is transmitted to assist timing estimation in a receiver. The comparative performance of both of the sequences is demonstrated. Both of the sequences are simulated with the variable frequency diversity order ranging from 1 to 5.

A time-synchronized signal is fed to a de-spreading block after frequency domain transformation. After, de-spreading channel estimation is performed by a least square method. The signal is detected after equalization.

The simulation assumes perfect frequency synchronization. Information symbols are spread by an 8 length Walsh-Hadamard code. To support diversity, different orthogonal codes are assigned to each sub-band to differentiate data. The simulation is performed with a single user transmitting either the same data over a plurality of sub-bands to improve BER performance (diversity order≥2), or transmitting different data over different sub-bands to maximize a data rate. Further, decoding is performed for sub-band 1. To obtain a sampling rate conversion from 100 MHz to 500 MHz, the training sequence is up sampled, whereas a data section is interpolated.

The performance of the 100 MHz synchronizer is compared with the performance of peak synchronization at 1 GHz to analyze the estimation loss due to sub-sampled estimation. It is observed that for the diversity order of 1, both of the performances match very closely, raising almost zero error in performance. As the diversity order increases, a mismatch between 100 MHz and 1 GHz performances also increases. For the zero diversity order, the synchronizer eliminates dispersion effects due to any one sub-band channel, and aligns an orthogonal code satisfactorily before addition in the method of the de-spreading. The orthogonal code rejects an effect of inter sub-band interferences in the process of the de-spreading in this example. Where, for the diversity examples, SNR losses are observed due to loss in orthogonality in between the same codes associated with different sub-bands. Another cause of this SNR loss contributes to an improper filter design at terminal filters. As training sequences are designed with a silence period at a domain, and fine estimation of the timing offset is performed at a higher sampling rate in analog, it is highly unlikely that major loss in SNR is contributed by an estimation error variance. Hence, the BER performance is verified with up sampling instead of interpolation for a data section to analyze an effect of a pulse shaping filter on the system performance with the same method of the timing synchronization.

Figure 5:
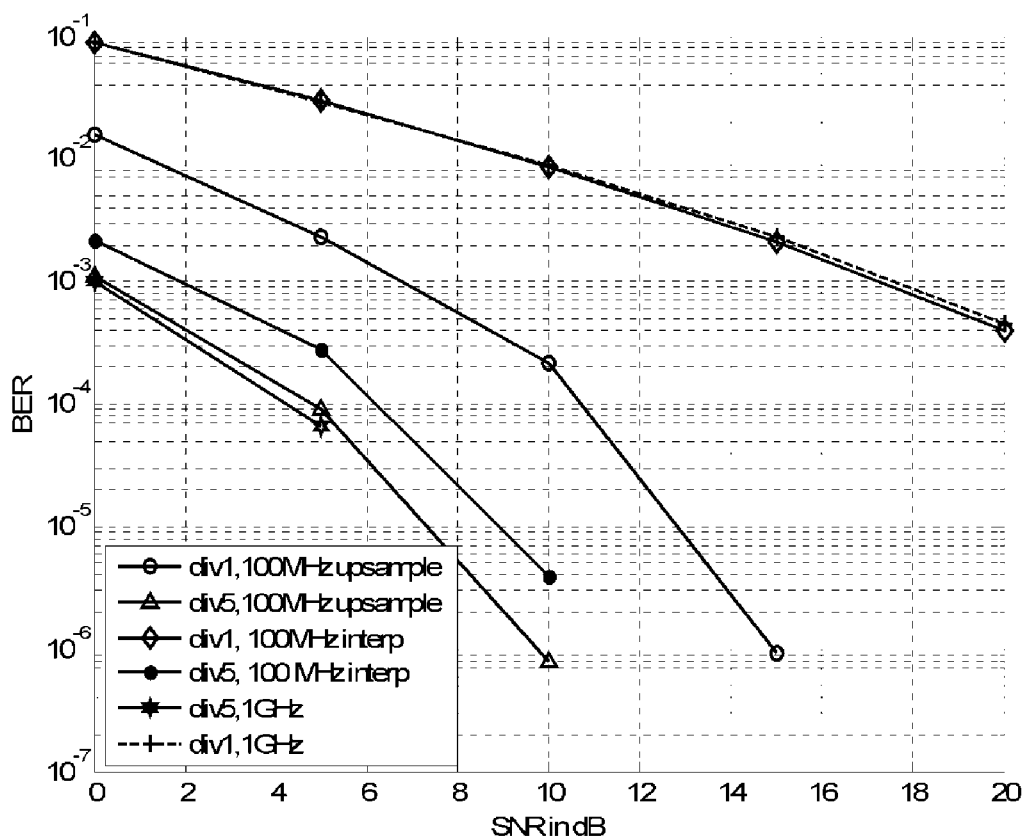
FIG. 5 is a graph illustrating another example of a comparison of a BER and a SNR of an OFDM-based S-UWB system with timing synchronization at 1 GHz and 100 MHz over an UWB channel.

FIG. 5 is a graph illustrating another example of a comparison of a BER and a SNR of an OFDM S-UWB system with timing synchronization at 1 GHz and 100 MHz over an UWB channel. The BER when a training sequence and a data part of a frame are up-sampled for diversity orders 1 and 5 is shown in FIG. 5. A significant improvement in the SNR of an order of 10 dB is observed at the BER of $10^{-3}$ compared to 1 GHz and 100 MHz performances with an interpolator for the diversity order of one. The SNR improvements are even higher for the BERs<10−3. Further, An SNR improvement of 2 dB is also observed at the same BER compared to 100 MHz performance with an interpolator for the diversity order of 5. The performances of a 100 MHz synchronizer now closely matches with that of a 1 GHz synchronizer.

Figure 6:
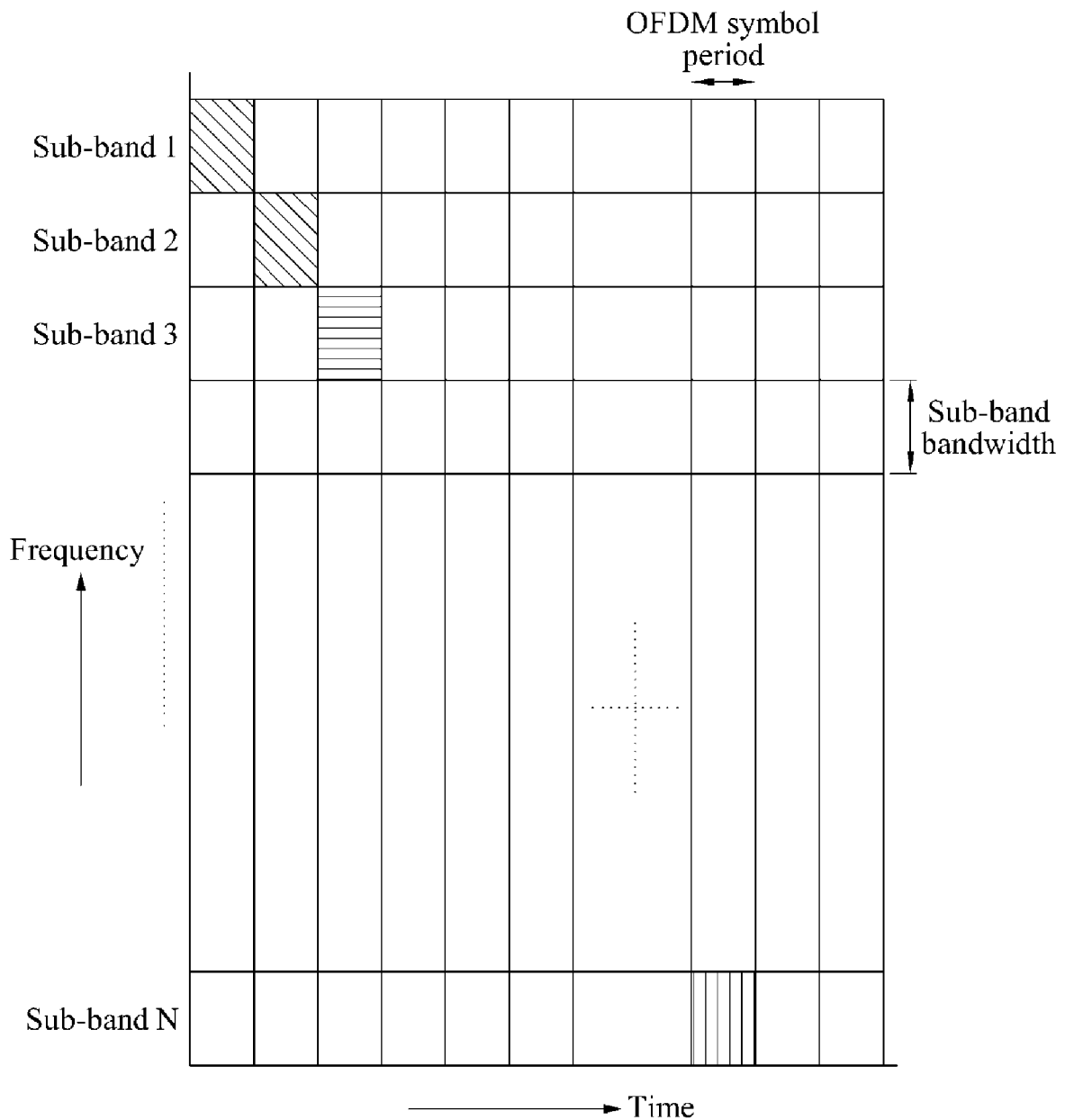
FIG. 6 is a diagram illustrating an example of a method of designing a training sequence for timing synchronization at a sub-sampled bandwidth.

FIG. 6 is a diagram illustrating an example of a method of designing a training sequence for timing synchronization at a sub-sampled bandwidth. The training sequence for a mixed mode timing synchronization method is described herein. The training sequence improves auto correlation and cross correlation properties. Side lobes of a correlation function may be within a range of 60-70 dB lower than a peak. Further, a correlation property of a sequence may be preserved in both a full rate and a sub-sampled rate. Further, the training sequence is designed in such a way that it can accommodate a latency period of coarse estimation in a digital domain, digital and/or analog circuitry on a feedback path from digital to analog, fine estimation in an analog domain, and analog circuitry generating an equivalent parameter from the fine estimation.

The base training sequence is transmitted at a different timing epoch to estimate related timing offsets of different sub-bands. Further, the base training sequence occupies a duration of one OFDM symbol. In a total time period of five OFDM symbols, a training symbol of a sub-band appears for a duration of one OFDM symbol, and for a rest of the time, it is padded with zeros.

Training sequences for different bands are designed such that they do not overlap with each other at an OFDM symbol duration, over the total period of five OFDM symbols. This ensures that the training sequence for each sub-band does not overlap with each other even after sub-sampling in a receiver.

In an example, a chirp sequence of length 42 is used as the basic sequence in the design of the training sequence. This complex chirp sequence shows improved auto correlation at a lag zero and near zero cross correlation at other lags.

The training sequence is designed to ensure a provision of a correct estimate of each of these offsets. The design also avoids inter carrier interference and inter band interference due to timing errors in a practical channel. Furthermore, in view of high data rate transmission, the training sequence is designed such that it poses an efficient bandwidth.

In an example, in order to make a design bandwidth efficient, the training sequence for each band is transmitted for one OFDM symbol period without any repetition. The accurate offset estimate in each sub-band is ensured by silence periods for other bands, when the training sequence is transmitted for any sub-band. Further, to reduce inter sub-band interferences due to a timing estimation, different types of a circularly-shifted version of chirp sequences (which confirms orthogonality up to a shifted delay) may be transmitted for a better estimate in high delay spread channels.

In an example, the same chirp sequence can be utilized for all of the sub-bands for low delay spread channels. To preserve the correlation property of the training sequence in both the full rate and sub-sampled domains, the basic sequence occupying bandwidth is up-sampled to generate the sequence in 500 MHz.

Figure 7:
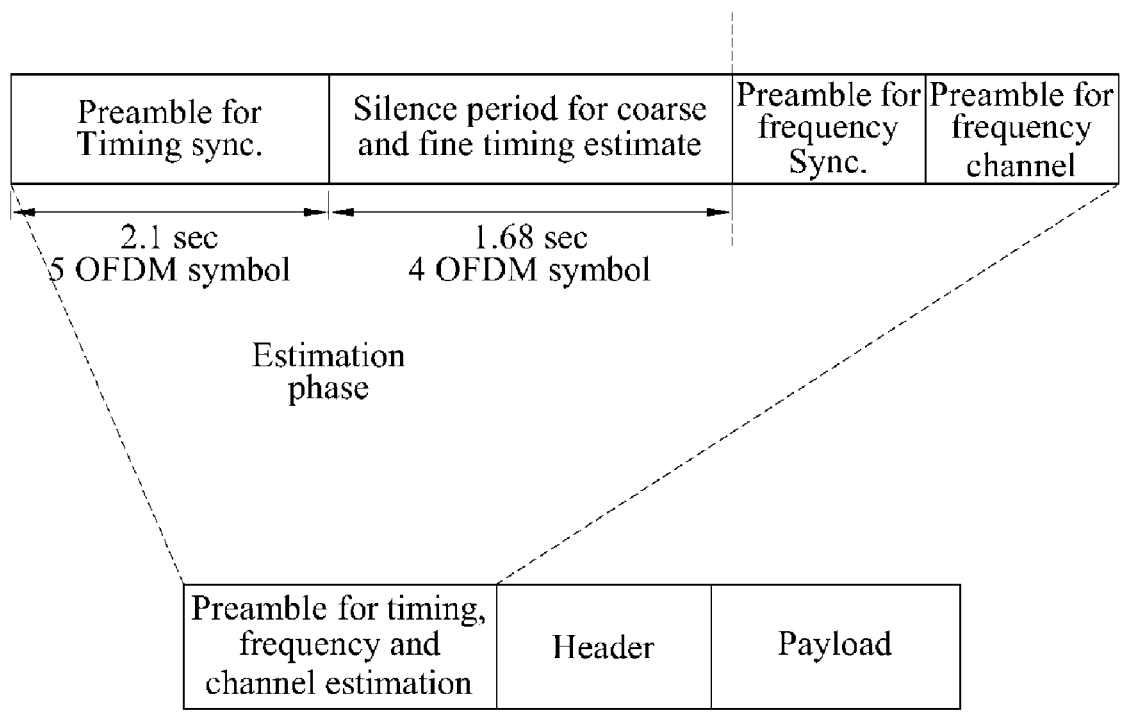
FIG. 7 is a schematic diagram illustrating an example of a frame format of an OFDM-based S-UWB system.

FIG. 7 is a schematic diagram illustrating an example of a frame format of an OFDM-based S-UWB system. Training sequences (preambles) for timing synchronization are added for a desired band in a preamble section dedicated for a frequency synchronization sequence of a frame. An accurate offset estimate in each sub-band is ensured by silence periods for other bands, when a training sequence is transmitted for any sub-band.

In order to make a design bandwidth efficient the training sequence for each band is transmitted for one OFDM symbol period without any repetition. To reduce an inter sub-band interferences due to timing estimation, a different circularly-shifted version of chirp sequences (which confirms orthogonality up to a shifted delay) may be transmitted for a better estimate in high delay spread channels.

The training sequences are followed by a silence period of four OFDM symbol periods as shown in FIG. 7, to accommodate a latency of an electronic circuit that feeds back a coarse estimate from digital to analog, a fine estimation, generating of equivalent phase information, and adjusting an ADC clock. However, a duration of the silence period can be reduced as the latency of the electronic circuit reduces due to advancement in device characteristics.

The method and apparatus for timing synchronization described may save power, cost and chip area. Further, the method and apparatus may achieve a good performance, because of a silence period based training sequence design.

The various units, blocks, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of timing synchronization in sub-band based ultra wideband systems, the method comprising:
    obtaining, using a coarse estimation unit, a coarse estimate of an offset in a time domain at a sub-sampled rate, wherein the obtaining of the coarse estimate comprise performing, using the coarse estimation unit, cross correlation of a sub-sampled signal with a sub-sampled training sequence in a digital domain;
    obtaining, using a fine estimation unit, a fine estimate of the offset in an analog domain; and
    correcting, using a timing correction unit, a timing in the analog domain by transforming the fine estimate to an equivalent phase for the correcting.

2. The method as in claim 1, wherein the method further comprises:
    obtaining, using the coarse estimation unit, the coarse estimate for each sub-band based on a frequency diversity order of a user.

3. The method as in claim 2, wherein the method further comprises:
    obtaining, using the coarse estimation unit, a final coarse estimate of the offset from each sub-band by determining a maximum of estimates for a corresponding sub-band.

4. The method as in claim 3, wherein the obtaining of the fine estimate comprises:
    obtaining, using the fine estimation unit, the fine estimate in the analog domain based on the final coarse estimate.

5. The method as in claim 1, wherein the obtaining of the fine estimate comprises:
    performing, using the fine estimation unit, cross correlation of a delayed signal with a training sequence designed with a silence period.

6. The method as in claim 5, wherein a length of the training sequence is equal to a number of orthogonal subcarriers present over a bandwidth of the delayed signal.

7. The method as in claim 5, wherein the training sequence is an up-sampled version of a base training sequence.

8. The method as in claim 5, wherein the training sequence of a sub-band is orthogonal up to a lag gap of an integer, the lag gap indicating a shift of sub-bands by a value of the integer.

9. The method as in claim 5, wherein the training sequence is followed by the silence period of at least four orthogonal frequency division multiplexing symbols.

10. An apparatus configured to perform timing synchronization in sub-band based ultra wideband systems, the apparatus comprising:
    a coarse estimation unit configured to obtain a coarse estimate of an offset in a time domain at a sub-sampled rate, wherein the coarse estimation unit is configured to perform cross correlation of a sub-sampled signal with a sub-sampled training sequence in a digital domain;
    a fine estimation unit configured to obtain a fine estimate of the offset in an analog domain; and
    a timing correction unit configured to correct a timing in the analog domain by transforming the fine estimate to an equivalent phase for the correction.

11. The apparatus as in claim 10, wherein the fine estimation unit is configured to:
    perform cross correlation of a delayed signal with a training sequence designed with a silence period.

12. The apparatus as in claim 10, further comprising:
    a phase locked loop circuit configured to determine the equivalent phase based on the fine estimate;
    an analog-to-digital converter configured to convert an input signal in the analog domain to a sub-sampled signal in a digital domain to be used to obtain the coarse estimate; and
    an analog delay circuit configured to delay the input signal, the delayed input signal being used to obtain the fine estimate.

13. A receiver configured to perform timing synchronization in sub-band based ultra wideband systems, the receiver comprising:
    a processor configured to
    determine a first estimate of a timing offset of an input signal, in a digital domain, wherein the processor is configured to
    sub-sample the input signal to generate a sub-sampled signal in the digital domain: and
        perform cross correlation of the sub-sampled signal with a sub-sampled training sequence in the digital domain to generate the first estimate,
        determine a second estimate of the timing offset in an analog domain based on the first estimate, and
        determine an equivalent phase to be used to correct a timing of the input signal, based on the second estimate.

14. The receiver as in claim 13, wherein the processor is further configured to:
    scale the first estimate; and
    determine the second estimate based on the scaled first estimate.

15. The receiver as in claim 13, wherein the processor is configured to:
    delay the input signal; and
    perform cross correlation of the delayed input signal with a training sequence followed by a silence period, based on the first estimate, to generate a correlated output.

16. The receiver as in claim 15, wherein the processor is configured to:
    determine the second estimate to be the same value as the first estimate in response to the correlated output being greater than or equal to a predetermined threshold.

17. The receiver as in claim 13, wherein the processor is configured to:
    control a switching of an analog-to-converter clock from an initial phase to the equivalent phase based on a predetermined timing delay, to correct the timing of the input signal.

* * * * *